United States Patent [19]
Butler

[11] Patent Number: 5,584,348
[45] Date of Patent: Dec. 17, 1996

[54] GUARD FOR A STRING-TYPE LAWN TRIMMER

[76] Inventor: Robert L. Butler, Box 596, Wallace, N.C. 28466

[21] Appl. No.: 421,748

[22] Filed: Apr. 13, 1995

[51] Int. Cl.6 ........................................... A01G 3/06
[52] U.S. Cl. ................ 172/13; 30/276; 56/12.1; 56/12.7
[58] Field of Search ................. 30/276; 56/12.1, 56/12.7, 12.9; 172/11, 12, 13, 14, 15, 16, 17, 18, 19; 439/369, 371, 372

[56] References Cited

U.S. PATENT DOCUMENTS

| | | | |
|---|---|---|---|
| 3,613,046 | 10/1971 | Kirk | 439/369 |
| 4,189,901 | 2/1980 | Poettgen | 56/12.7 X |
| 4,204,738 | 5/1980 | Tillotson | 439/369 |
| 4,890,389 | 1/1990 | Whitkop | 30/276 |
| 5,048,187 | 9/1991 | Ryan | 30/276 |
| 5,060,383 | 10/1991 | Ratkiewich | 30/276 |
| 5,423,126 | 6/1995 | Byrne | 30/276 |

*Primary Examiner*—Terry Lee Melius
*Assistant Examiner*—Robert Pezzuto
*Attorney, Agent, or Firm*—Rhodes, Coats & Bennett, L.L.P.

[57] ABSTRACT

The present invention provides an arcuate ring guard for a conventional lawn trimmer having a string-type cutting blade, which rotates in a planar cutting circle, and an arcuate housing covering the rearward region of the cutting circle but having an open front potion. The ring guard is fastened at each end to opposite sides of the trimmer housing, forwardly of and outside the periphery of the blade's cutting circle, so that the trimmer housing and the ring guard together extend 360 degrees around the periphery of the cutting circle. In the preferred embodiment, the ring guard occupies a uniform arc about the cutting blade's axis of rotation, coplanar with the blade's cutting circle.

17 Claims, 3 Drawing Sheets

GUARD FOR A STRING-TYPE LAWN TRIMMER

FIELD OF THE INVENTION

The present invention relates to string-type lawn trimmers and particularly relates to an arcuate ring guard that attaches to the trimmer housing to provide 360 degree circumferential protection around the periphery of the string's cutting circle.

BACKGROUND OF THE INVENTION

String-type weed and grass trimmers, which have rotating, filamentous cutting blades, are commonly used to edge lawns and cut vegetation in hard-to-reach places that conventional lawnmowers cannot reach. While string trimmers are useful for applications such as cutting grass close to tree trunks and flower beds, they have numerous disadvantages relating to the configuration of the cutting blade and a typical guard housing. Typically, the cutting blade of the string trimmer rotates below a motor about an axis in a planar cutting circle. A curved guard housing is typically provided behind the cutting circle and extends approximately one-rough to one-half the circumference around the rearward periphery of the cutting circle. The cutting string or blade is thus exposed in the forward regions of the cutting circle, which can be dangerous and can cause inadvertent damage to vegetation such as trees and flowers next to the weeds or grass being cut. Another disadvantage of having the forward periphery of the cutting circle exposed is that damage readily occurs to the cutting filament or blade when the cutting blade inadvertently contacts a hard object such as a tree or sidewalk. This leads to the necessity of having to more frequently pay out additional cutting filament, in the case of string-type blades, or more frequently sharpen or replace chain-type metal cutting blades.

In the past, attempts have been made to provide guards for string type trimmers. Several prior art string trimmer guards have provided protection around only a portion of the cutting circle. Other prior art string trimmer guards have provided circular guard discs that lie above the cutting blade's circle, not coplanar with the blade. Until now, there has been no string trimmer guard that provides 360° degree circumferential protection around the entire periphery of the cutting circle, coplanar with the cutting blade.

Typically, electric lawn trimmers receive power through a conventional extension cord, the female end of which plugs into a socket on the end of the trimmer's handle. However, extension cords tend to be pulled out of the socket, inconveniencing and interrupting the user. Therefore, there is a need for a device that securely holds the extension cord in the plug socket of an electric lawn trimmer.

SUMMARY AND OBJECTS OF THE INVENTION

The present invention provides an arcuate ring guard for a conventional lawn trimmer, typically having a string-type cutting blade that rotates in a planar cutting circle, and an arcuate housing behind the cutting circle with an open front portion. The ring guard is fastened at each end to opposite sides of the trimmer housing, forwardly of and outside the periphery of the blade's cutting circle, so that the trimmer housing and the ring guard together extend 360 degrees around the periphery of the cutting circle. In the preferred embodiment, the ring guard occupies a uniform arc about the cutting blade's axis of rotation, coplanar with the blade's cutting circle. The ring guard may be permanently mounted to the trimmer housing, such as with rivets, or may be detachably fastened, such as with buckles or mounting brackets to hold the ring guard securely to the trimmer housing. The ring guard may be fabricated from any suitable, rigid material such as plastic, or may be formed by shaping a metal rod into an arc.

It is therefore an object of the present invention to provide a guard for a lawn trimmer that, together with the lawn trimmer's existing guard housing, provides full 360 protection around the entire circumference of the cutting circle of a string-type cutting blade.

Another object of the present invention is to provide an arcuate ring guard for a lawn trimmer that lies in a uniform arc about the cutting blade's axis of rotation, coplanar with the blade's cutting circle.

Another object of the present invention is to provide an arcuate ring guard for a lawn trimmer that protects the root base of plants and prevents scalping or other damage to plants or structures next to the vegetation being cut by the lawn trimmer.

Another object of the present invention is to provide an arcuate ring guard for a lawn trimmer that prevents breaking and fraying of a filamentous cutting blade.

Another object of the present invention is to provide an arcuate ring guard for a lawn trimmer that may be detachable or may be permanently mounted to the trimmer housing.

An additional object of the present invention is to provide means for securing a power cord to an electric lawn trimmer so that the power cord cannot be inadvertently unplugged from the lawn trimmer during use.

Other objects and advantages of the present invention will become apparent and obvious from a study of the following description and the accompanying drawings, which are merely illustrative of such invention.

DETAILED DESCRIPTION OF THE INVENTION

Figure 1:
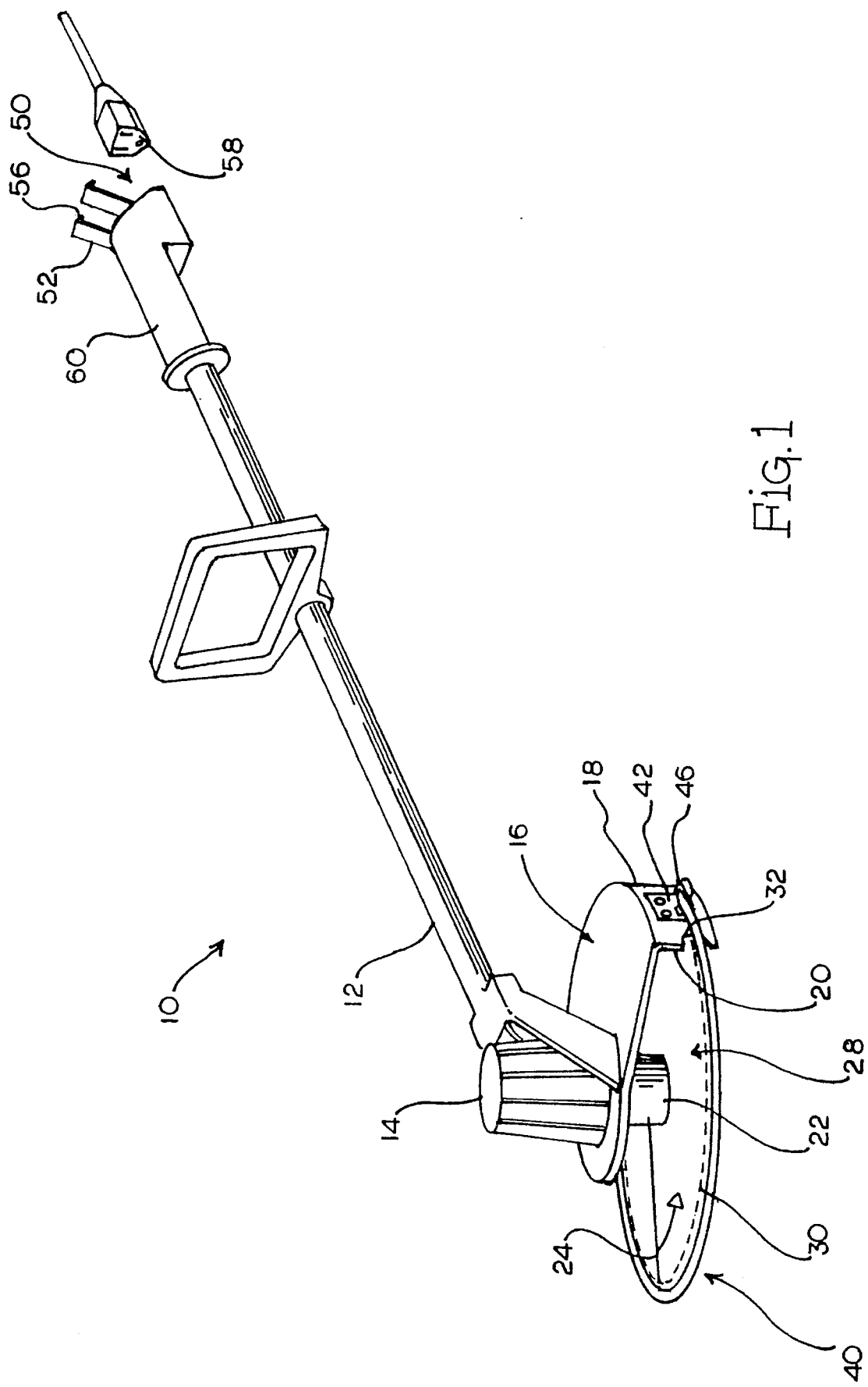
FIG. 1 is a perspective view of a conventional string trimmer having an arcuate ring guard of the invention attached thereto so as to provide 360 degree protection around the periphery of the cutting blade's cutting circle.

FIG. 1 depicts a typical string-type lawn trimmer used for edging lawns, cutting weeds, and the like, which is generally indicated by the numeral 10. Attached to the lawn trimmer 10 is an arcuate ring guard, which is generally indicated by the numeral 40. The lawn trimmer 10 shown here is of a conventional design and includes an angled support shaft 12 attached to a motor 14, which in this embodiment is electric, but in other embodiments could be gas powered.

Extending below and driven by the motor 14 about a rotating axis 26 is a hub 22, from which extends a cutting blade 24. The cutting blade 24 may be a filamentous string, a metal wire or chain, or a solid metal blade. Typically, however, the cutting blade 24 is a nylon filament that is paid out from a reel contained within the hub 22, and this disclosure will focus on this filamentous type of cutting blade for simplicity. The cutting blade 24 spins within a planar cutting circle 28, the outer periphery 30 of which is defined by the radial length of the cutting blade 24.

Extending outwardly from the motor 14 is a guard housing 16, which, on the lawn trimmer 10 shown here, extends rearwardly from the motor 14, beneath the support shaft 12 and above the plane of the cutting circle 28. The housing 16 typically covers about one-fourth to one-half of a rearward region of the cutting circle 28. The housing 16 includes a downwardly extending arcuate side wall 18, which, on the trimmer shown here, extends around approximately one-third of the periphery 30 of the cutting circle 28. On each side of the side wall 18 are front edges 20. A filament knife 32 is provided on one front edge 20 to cut the filament to the proper length after it has been paid out from the hub 22.

Figure 2:
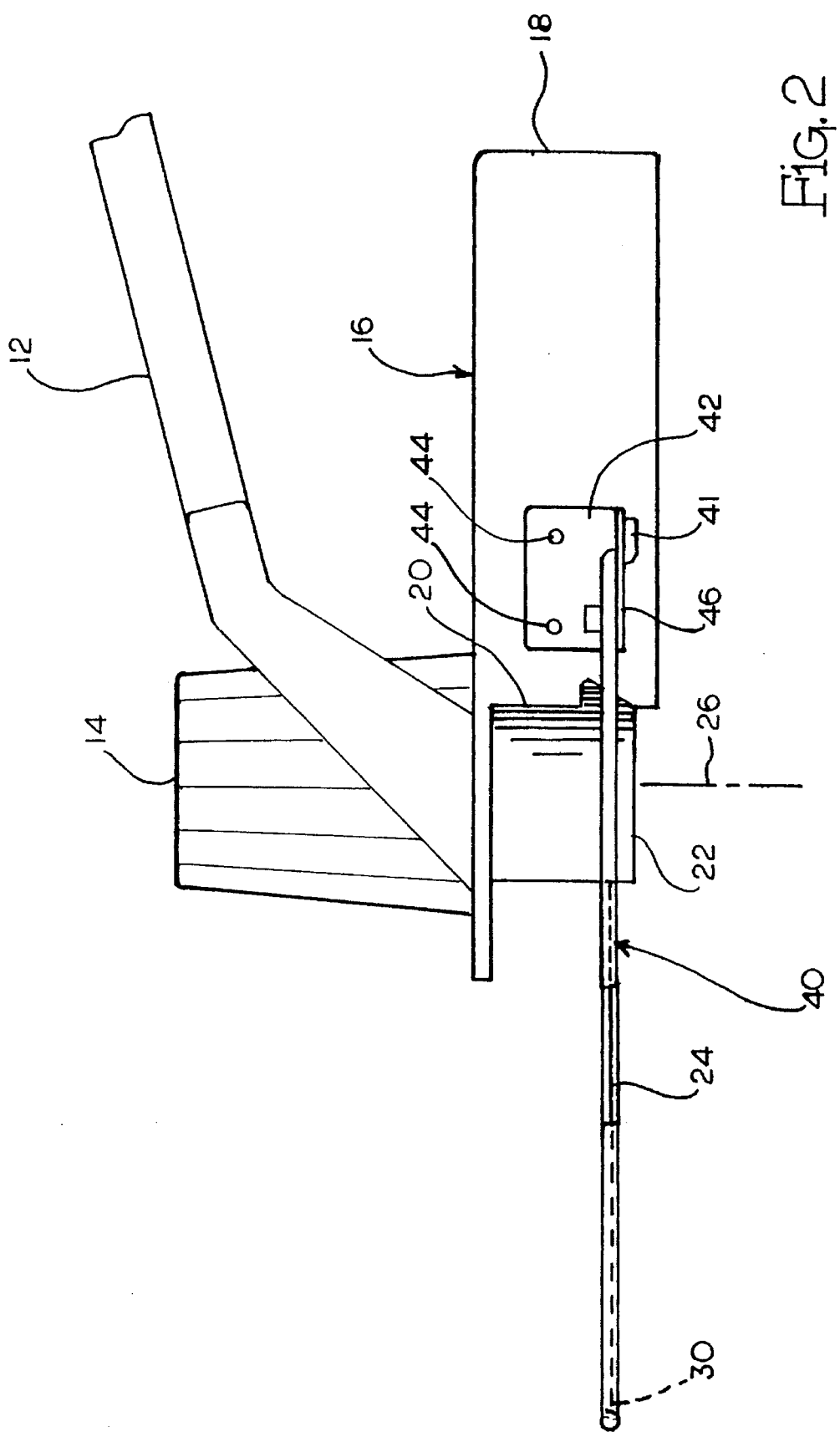
FIG. 2 is an elevational side view of the string trimmer with the arcuate ring guard attached to the string trimmer's existing guard housing and partially cut away to reveal the cutting blade.
Figure 3:
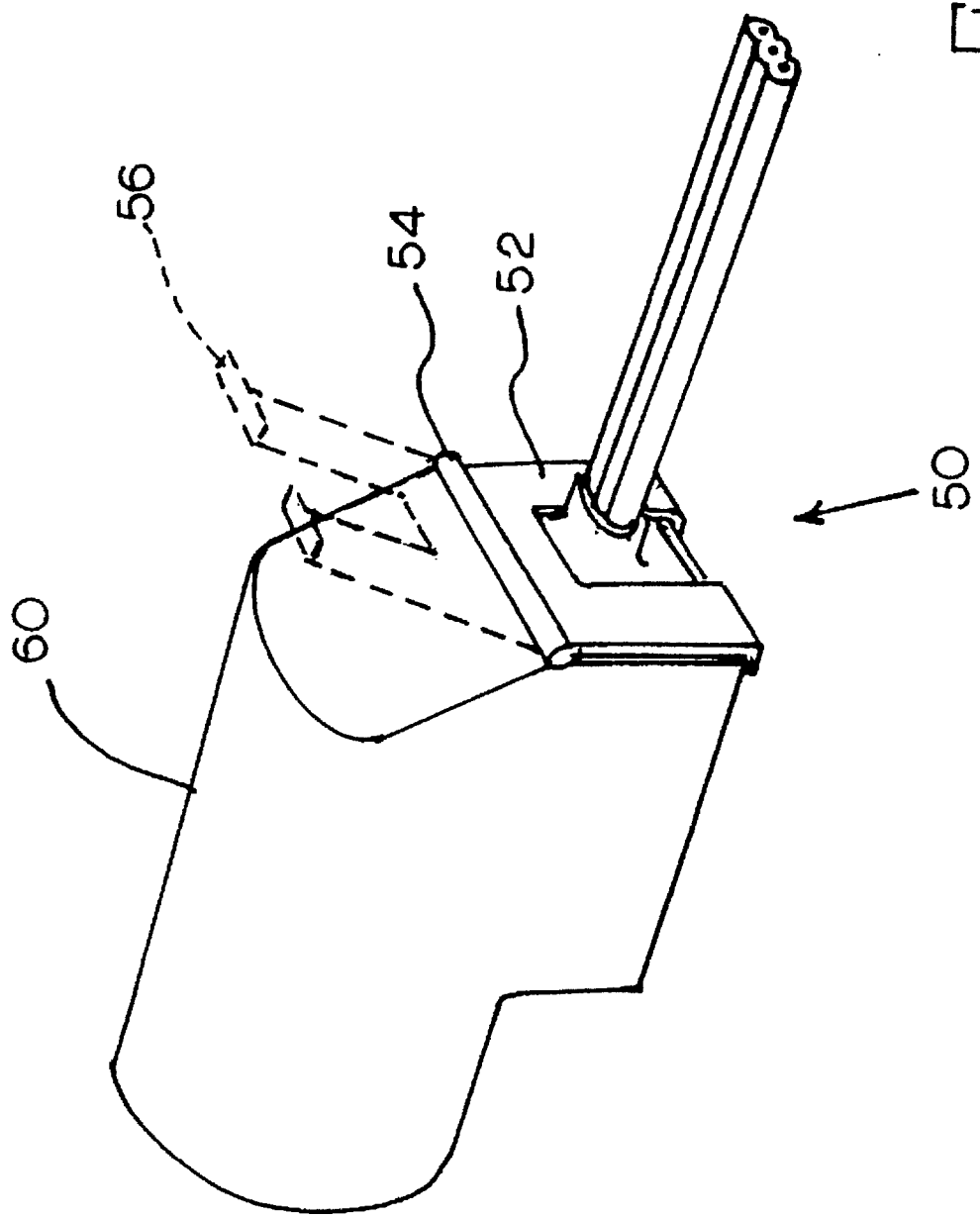
FIG. 3 depicts the end of the handle of an electric lawn trimmer, which has a hinged flap to prevent accidental unplugging of a power cord.

The arcuate ring guard 40 is attached at each end to opposite sides of the side wall 18 proximate the front edges 20 and extends forwardly of the blade's cutting circle 28. In FIG. 2, the ring guard 40 is shown detachably engaged at one end to the guard housing 16 by a bracket 42, which is mounted on the outside surface of the side wall 18 with fasteners 44, such as screws or rivets. In this embodiment, the ring guard 40 has a generally S-shaped end 41 that fits through a hole in a laterally extending flange 46 of the bracket 42. A tab 48 on the bracket 42 helps hold the ring guard 40 to the bracket 42 and prevents the ring guard 40 from swinging upwardly. It should be understood that the other side of the ring guard 40 (not shown) may be similarly attached to a second bracket on the other side of the guard housing 16. The ring guard 40 may also be permanently affixed to the guard housing 16, such as by rivets, bolts, etc.

The ring guard 40 is preferably constructed from a rigid material, such as a cold-roll steel rod, an aluminum rod, or rigid plastic, formed into a uniformly arcuate shape. The ring guard 40 preferably lies slightly outside the periphery 30 of the cutting circle 28 and coplanar with the cutting circle 28. FIG. 2 illustrates this coplanar positioning by showing a small portion of the ring guard 40 cut away to reveal the cutting blade within the inner boundaries of the ring guard 40. Such positioning of the ring guard 40 provides optimal protection for the distal end of the cutting blade 24 by preventing the cutting blade from contacting trees, sidewalks, and the like, yet allowing the cutting blade 24 to approach such objects closely enough to cut vegetation growing therebeside.

The lawn trimmer used as an example herein is electrically powered, and the handle 60 on the end of the support shaft 12 of the lawn trimmer 10 has a typical socket 50 with male terminals for plugging into the female end 58 of an extension cord. To prevent accidental disengagement of the extension cord from the socket 50, a U-shaped flap 52 is attached to the handle 60 by a hinge 54, which closes over the extension cord end 58. The flap 52 is held in a closed position by closure snaps 56.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A guard for a lawn trimmer having a filament-type cutting blade, which rotates about an axis in a planar cutting circle, and a partially circumferential arcuate housing disposed rearwardly of the cutting circle, the guard comprising:

(a) an arcuate ring guard including a first end and a second end;

(b) first and second brackets mounted to opposite sides of the arcuate housing;

(c) wherein the first and second ends of the arcuate ring guard are attached respectively to the first and second brackets on the opposite sides of the arcuate housing;

(d) wherein the arcuate ring guard is disposed forwardly of the blade's cutting circle outside the periphery of the cutting circle; and is coplaner with the blade cutting circle and (e) wherein the arcuate housing and the arcuate ring guard together extend 360 degrees around the periphery of the cutting circle.

2. The guard of claim 1 wherein the ring guard is disposed in a uniform arc about the cutting blade's axis of rotation.

3. The guard of claim 1 wherein the brackets are mounted to the arcuate housing proximate opposing front edges of the arcuate housing.

4. The guard of claim 1 wherein at least one of the ends of the arcuate ring guard is generally S-shaped for detachable engagement with a respective one of the brackets.

5. The guard of claim 4 wherein the bracket with which the generally S-shaped end of the arcuate ring guard detachably engages includes a laterally extending flange having a hole therethrough through which the generally S-shaped end of the arcuate ring guard is adapted to fit.

6. The guard of claim 5, wherein the bracket with which the generally S-shaped end of the arcuate ring guard detachably engages further includes a tab that secures the S-shaped end of the ring guard to the bracket and prevents the ring guard from swinging upwardly.

7. The guard of claim 4, wherein both the first and second ends of the arcuate ring guard include S-shaped ends for detachable engagement with the first and second brackets.

8. The guard of claim 1 wherein the ring guard is fabricated from a metal rod.

9. The guard of claim 1 wherein the ring guard is fabricated from a plastic rod.

10. A lawn trimmer having a filament-type cutting blade, which rotates about an axis in a planar cutting circle, comprising:

(a) a partially circumferential arcuate trimmer housing disposed rearwardly of the cutting circle;

(b) a first bracket mounted to one side of the arcuate trimmer housing and including an attachment flange;

(c) a second bracket mounted to an opposite side of the arcuate trimmer housing and including an attachment flange;

(d) an arcuate ring guard including first and second ends, the first end detachably engaged with the attachment flange of the first bracket and the second end detachably engaged with the attachment flange of the second bracket;

(e) wherein the arcuate ring guard is disposed forwardly of the blade's cutting circle, outside the periphery of the cutting circle; and is coplanar with the blade cutting circle and (f) wherein the arcuate trimmer housing and the arcuate ring guard together extend 360 degrees around the periphery of the cutting circle.

11. The lawn trimmer of claim 10 wherein the brackets are mounted to the arcuate trimmer housing proximate opposing front edges thereof.

12. The lawn trimmer of claim 10 wherein the attachment flanges of the first and second brackets comprise laterally extending flanges, each having a hole therethrough through which the ends of the arcuate ring guard are adapted to fit.

13. The lawn trimmer of claim 12, wherein the brackets further includes tabs that secure the ends of the arcuate ring guard to the brackets and prevent the ring guard from swinging upwardly.

14. The lawn trimmer of claim 13, wherein the ends of the arcuate ring guard are generally S-shaped.

15. The lawn trimmer of claim 10 further comprising an electric motor for turning the cutting blade and a power cord plug connected to the electric motor.

16. The lawn trimmer of claim 15 further comprising means for securing a power cord to the power cord plug.

17. The lawn trimmer of claim 9 wherein the ring guard is disposed in a uniform arc about the cutting blade's axis of rotation.

* * * * *